United States Patent
Chen et al.

(10) Patent No.: US 10,630,665 B2
(45) Date of Patent: Apr. 21, 2020

(54) AUTHENTICATING MESSAGES

(71) Applicant: BlackBerry Limited, Waterloo (CA)

(72) Inventors: Shu-Lin Chen, Kanata (CA); Reguina Bouianovskaia, Nepean (CA); Michael Eoin Buckley, Grayslake, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 95 days.

(21) Appl. No.: 15/131,489

(22) Filed: Apr. 18, 2016

(65) Prior Publication Data
US 2017/0302639 A1 Oct. 19, 2017

(51) Int. Cl.
| | |
|---|---|
| H04L 29/06 | (2006.01) |
| G06F 15/16 | (2006.01) |
| G06F 7/04 | (2006.01) |
| H04W 4/14 | (2009.01) |
| H04W 12/06 | (2009.01) |
| H04W 12/04 | (2009.01) |
| H04W 12/10 | (2009.01) |
| H04W 12/12 | (2009.01) |
| H04W 4/12 | (2009.01) |

(52) U.S. Cl.
CPC .......... *H04L 63/08* (2013.01); *H04L 63/06* (2013.01); *H04L 63/0823* (2013.01); *H04L 63/1466* (2013.01); *H04W 4/14* (2013.01); *H04W 12/04* (2013.01); *H04W 12/06* (2013.01); *H04W 12/10* (2013.01); *H04W 12/1208* (2019.01); *H04W 4/12* (2013.01)

(58) Field of Classification Search
CPC ..... H04L 63/08; H04L 63/06; H04L 63/0823; H04W 4/14; H04W 12/04; H04W 12/06

USPC ............................................. 726/7
See application file for complete search history.

(56) References Cited

U.S. PATENT DOCUMENTS

| | | | |
|---|---|---|---|
| 9,167,275 B1 * | 10/2015 | Daily | H04N 21/812 |
| 2002/0194499 A1 * | 12/2002 | Audebert | H04L 63/0853 726/35 |
| 2003/0131063 A1 * | 7/2003 | Breck | H04L 51/12 709/206 |
| 2008/0086532 A1 | 4/2008 | Cunningham | |
| 2009/0325615 A1 * | 12/2009 | McKay | H04L 63/02 455/466 |
| 2011/0307386 A1 * | 12/2011 | Appelman | H04L 63/08 705/60 |

(Continued)

FOREIGN PATENT DOCUMENTS

WO 2014/198745 12/2014

OTHER PUBLICATIONS

Sigeru Sato ; Experimental Verification of Grasping Information ; IEEE 2006; p. 2262-2264.*

(Continued)

*Primary Examiner* — Monjur Rahim
(74) *Attorney, Agent, or Firm* — Fish & Richardson P.C.

(57) ABSTRACT

Systems, methods, and software can be used to share content. In some aspects, a message is received at an electronic device from a sender. A first type 0 short message service (SMS) message is sent, from the electronic device to the sender. The first type 0 SMS message indicates an authentication request for the message. A second type 0 SMS message is received at the electronic device. The second type 0 SMS message indicates that the message is authenticated.

17 Claims, 3 Drawing Sheets

(56) References Cited

U.S. PATENT DOCUMENTS

| | | | |
|---|---|---|---|
| 2012/0088473 A1* | 4/2012 | Jussila | H04L 63/0853 455/411 |
| 2012/0230336 A1* | 9/2012 | Nishiyama | H04L 45/741 370/392 |
| 2015/0052034 A1 | 2/2015 | Kim et al. | |
| 2015/0121480 A1* | 4/2015 | Efrati | H04L 63/1466 726/5 |
| 2015/0128238 A1* | 5/2015 | Du | H04L 9/321 726/7 |
| 2016/0014076 A1* | 1/2016 | Hansen | H04L 63/02 726/11 |
| 2016/0050259 A1* | 2/2016 | Banerjee | H04L 67/10 713/168 |
| 2016/0127902 A1* | 5/2016 | Ciarniello | H04L 63/0838 380/247 |

OTHER PUBLICATIONS

Extended European Search Report issued in European Application No. 17160939.9 dated Aug. 24, 2017; 7 pages.
Communication Pursuant to Article 94(3) EPC issued in European Application No. 17160939.9 dated Mar. 27, 2019, 7 pages.
Communication under Rule 71(3) EPC issued in European Application No. 17160939.9 dated Nov. 22, 2019, 7 pages.

* cited by examiner

AUTHENTICATING MESSAGES

BACKGROUND

The present disclosure relates to authenticating messages. In some cases, messages, e.g., Short Message Service (SMS) messages, can be communicated in a communication network. An electronic device may receive and send messages. In some cases, these messages can be formatted according to a standardized communications protocol, e.g., the SMS protocol.

DESCRIPTION OF DRAWINGS

Like reference numbers and designations in the various drawings indicate like elements.

DETAILED DESCRIPTION

In some cases, the sender of a message can be identified in the message. For example, a SMS message can include a header portion and a body portion. The header portion can include a "from address" field that indicates the identity of the sender and a "to address" field that indicates the identity of the receiver. In some cases, the "from address" field can include a phone number of the sender, or an alphanumeric text representing the name or other information of the sender.

In some cases, the sender information in the message can be manipulated by an attacker. For example, an attacker may send a message to a receiver, but including in the message information that identifies the sender as someone else. In some cases, the information that identifies the sender, e.g., the "from address" field in the SMS message, may not be authenticated. Therefore, such attack may not be easily recognized.

In some cases, a different message, e.g., a type 0 SMS message, can be used to send authentication information that can be used to authenticate a message. A type 0 SMS message is a silent SMS message formatted according to the SMS protocol. In some cases, the type 0 SMS message can be formatted by setting the protocol identity (PID) in the header of the SMS message to "type 0." In some cases, the PID can be set to "64" to indicate that the SMS message is a type 0 SMS message.

In some cases, a receiver that receives a message can send a first type 0 SMS message to the sender of the message. The first type 0 SMS message can indicate an authentication request for the message. In response, the sender can send a second type 0 SMS message. The second type 0 SMS message can indicate whether the received message is authenticated. In some cases, a sender that sends a message can send an authenticating type 0 SMS message. The authenticating type 0 SMS message can include authentication information for the message to be authenticated. The authentication information can include a signature signed using a private key, a certificate associated with a public key corresponding to the private key, or any combinations thereof The receiver can use the authentication information to authenticate the message. FIGS. 1-6 and associated descriptions provide additional details of these implementations.

Using the type 0 SMS message for authentication may provide one or more advantages. For example, in some cases, the type 0 SMS message may not be displayed on an electronic device that receives the type 0 SMS message. In some cases, a type 0 SMS message may not trigger a notification on the electronic device that receives the type 0 SMS message. Therefore, if an electronic device does not support the authentication procedure, the type 0 SMS message would be dropped silently and the disruption to the operation of the electronic device may be limited.

Figure 1:
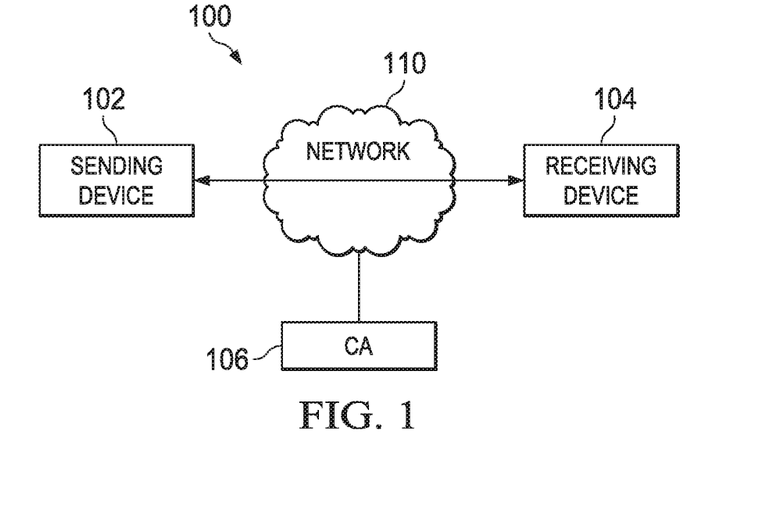
FIG. 1 is an example communication system that authenticates messages according to an implementation.

FIG. 1 is an example communication system 100 that authenticates messages according to an implementation. At a high level, the example communication system 100 includes a sending device 102 and a receiving device 104 that are communicably coupled over a network 110. The example communication system 100 also includes a certificate authority (CA) 106.

The CA 106 represents an application, set of applications, software, software modules, hardware, or any combinations thereof that can be configured to issue digital certificates. In a public-key infrastructure (PM), a digital certificate can be issued by a CA to certify the ownership of a public key by the named subject of the certificate. The owner of the public key can generate a signature using a private key that corresponds to the certified public key. A receiver of the signature can validate the identity of the owner based on the certified public key and the signature. The CA 106 can be a root CA, a subordinate CA, or a combination thereof.

The example communication system 100 includes the network 110. The network 110 represents an application, set of applications, software, software modules, hardware, or any combinations thereof that can be configured to transmit signals among the sending device 102, the receiving device 104, and the CA 106. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage.

The base station directly communicates to one or a plurality of mobile devices, other base stations, and one or more core network nodes.

The sending device 102 represents an application, set of applications, software, software modules, hardware, or any combinations thereof that can be configured to send a message. The receiving device 104 represents an application, set of applications, software, software modules, hardware, or any combinations thereof that can be configured to receive a message.

In operation, the receiving device 104 can receive a message from the sending device 102. The receiving device 104 can send a first type 0 SMS message to the sending device 102. The first type 0 SMS message can indicate an authentication request for the message. The sending device 102 can send a second type 0 SMS message to the receiving device 104. The second type 0 SMS message can indicate that the received message is authenticated. FIGS. 2-6 and associated descriptions provide additional details of these implementations.

In some cases, the sending device 102, or an application operating on the sending device 102, can generate a public key-private key pair. The sending device 102 can send the public key to the CA. The CA can generate a certificate and send the certificate to the electronic device. In some cases, the sending device 102 can include a signature signed by the private key in the second type 0 SMS message. In some cases, the sending device 102 can include the certificate associated with the corresponding public key in the second type 0 SMS message. FIGS. 2-6 and associated descriptions provide additional details of these implementations.

In some cases, the sending device 102 can send a message to the receiving device 104. The sending device 102 can also send a type 0 SMS message to the receiving device 104. The type 0 SMS message can include authentication information for the sent message. The authentication information can include a signature signed using a private key of the sending device, a certificate associated with the corresponding public key, or a combination thereof. FIGS. 2-6 and associated descriptions provide additional details of these implementations.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components, as appropriate.

Figure 2:
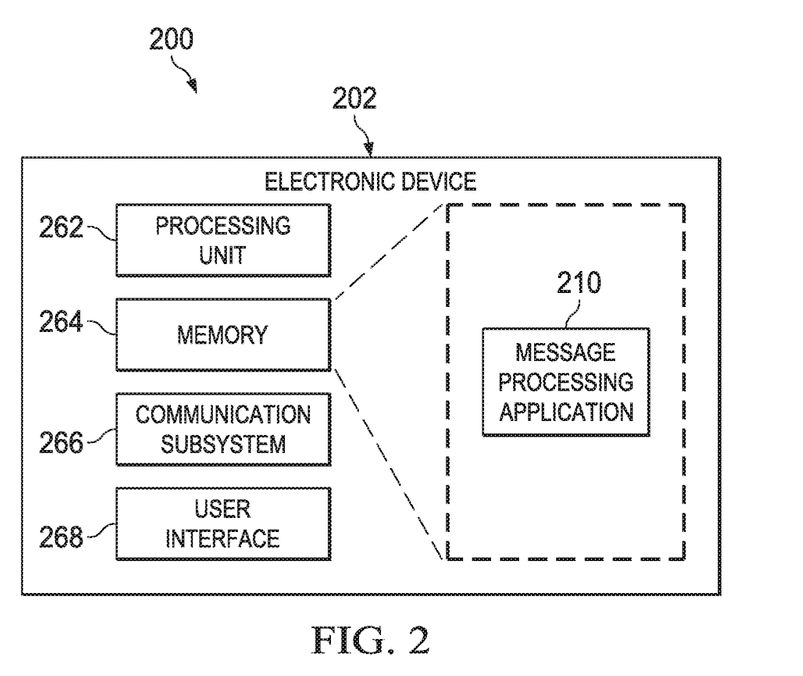
FIG. 2 is a schematic diagram showing an electronic device that authenticates messages.

FIG. 2 is a schematic diagram 200 showing an electronic device 202 that authenticates messages according to an implementation. In some cases, the electronic device 202 can be used to perform the function as the sending device 102 or the receiving device 104 shown in FIG. 1. The electronic device 202 includes a processing unit 262, a communication subsystem 266, a user interface 268, and a memory 264. An electronic device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. In some cases, the processing unit 262 can also be configured to make a radio resource management (RRM) decision, such as cell selection/reselection information or trigger a measurement report. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 266 can be an advanced receiver or a baseline receiver. Two receivers can be implemented with identical, similar, or different receiver processing algorithms.

The example user interface 268 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone.

The example memory 264 can be a computer-readable storage medium on the electronic device 202. Examples of the memory 264 include volatile and non-volatile memory, magnetic media, optical media, random access memory (RAM), read-only memory (ROM), removable media, and others. The memory 264 can store an operating system (OS) of electronic device 202 and various other computer-executable software programs for performing one or more of the processes, steps, or actions described above.

As shown in FIG. 2, the example memory 264 can include a message processing application 210. The message processing application 210 represents an application, set of applications, software, software modules, hardware, or any combinations thereof that can be configured to receive and send messages. In some cases, the message processing application 210 can authenticate a message that is sent or received by the electronic device 202. In one example, the message processing application 210 can receive a message, send a first type 0 SMS message to request authentication of the received message, and receive a second type 0 SMS message that indicates whether the received message is authenticated. In another example, the message processing application can send a message, and send a type 0 SMS message that includes authentication information for the sent message. FIGS. 3-6 and associated descriptions provide additional details of these implementations.

Turning to a general description, an electronic device, e.g., the electronic device 202, may include, without limitation, any of the following: computing device, mobile device, mobile electronic device, user device, mobile station, subscriber station, portable electronic device, mobile communications device, wireless modem, or wireless terminal. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Figure 3:
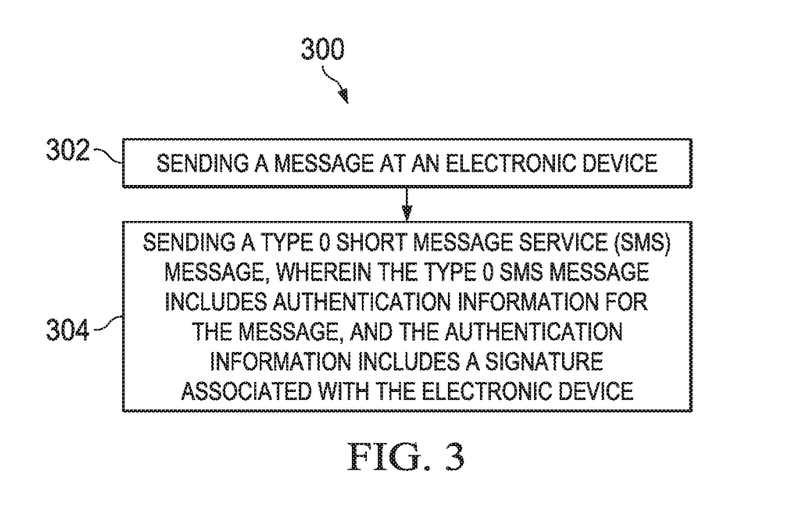
FIG. 3 is a flow diagram showing an example process for authenticating messages according to an implementation.

In some cases, an electronic device that sends a message can send a type 0 SMS message to include authentication information for the message. FIG. 3 is a flow diagram showing an example process 300 for authenticating messages according to an implementation. The process 300 can be implemented by an electronic device, e.g., the electronic device 202 shown in FIG. 2. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, where a message is sent from an electronic device. In some cases, the message can be a SMS message. Alternatively, the message can be a message associated with a data application running on the electronic device. For example, the message can be a chat associated with a social media application, an online chat application, or any other messages.

From 302, the process 300 proceeds to 304, where the electronic device sends a type 0 short message service (SMS) message. In some cases, the type 0 SMS message is sent to the same destination device as the message sent at 302.

Figure 5:
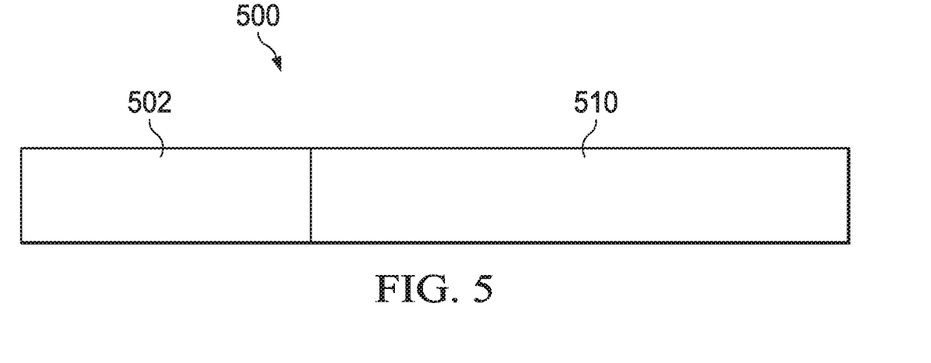
FIG. 5 illustrates an example type 0 SMS message according to an implementation.

In some cases, the type 0 SMS message includes authentication information for the message sent at 302. In some cases, the type 0 SMS message also includes content information of the message sent at 302. FIG. 5 illustrates an example type 0 SMS message 500 according to an implementation. As shown in FIG. 5, the type 0 SMS message 500 includes a message information field 502 and an authentication information field 510.

In some cases, the message information field 502 can include information that can be used to identify the message to be authenticated. In some cases, the message information field 502 can include a message index, a sequence number, or any other indicator that can be used to identify the message to be authenticated. Alternatively or in combination, the message information field 502 can include information associated with the content of the message sent at 302. In some cases, the information associated with the content of the message can include the entire message, the body of the message, or a portion of the message. Alternatively or in combination, information associated with the content of the message can include information generated based on the message or a portion of the message. For example, the message information field 502 can include a hash output generated based on the message. In some cases, the electronic device can apply a hash function on the message or a portion of the message to generate the hash output. The Secure Hash Algorithm (SHA)-256 algorithm, MD5, SHA-1, SHA-3 or other security algorithms can be used to generate the hash output.

Figure 6:
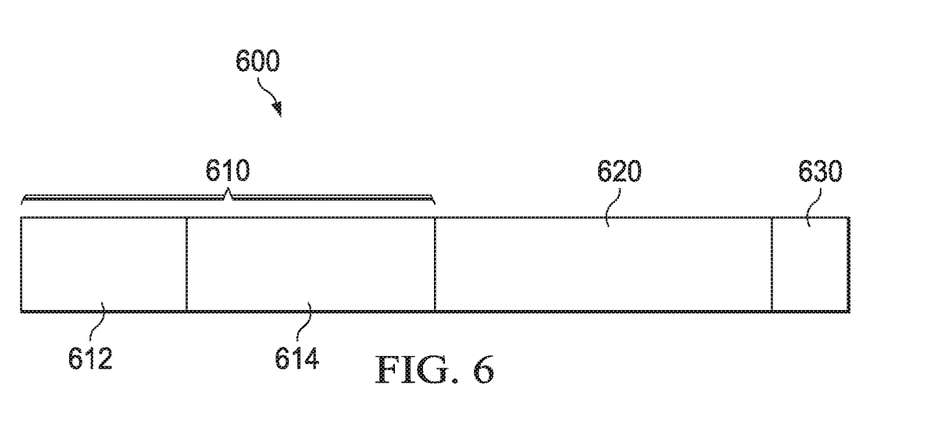
FIG. 6 illustrates an example authentication information field according to an implementation.

In some cases, the authentication information field 510 can include authentication information for the message sent at 302. The authentication information can include a signature, a certificate, a time stamp, or any combinations thereof. FIG. 6 illustrates an example authentication information field 600 according to an implementation. As shown in FIG. 6, the authentication information field 600 includes a signature field 610, a certificate field 620, and a timestamp field 630.

The signature field 610 includes a signature of the message. In some cases, the electronic device generates the signature using the message, a private key and a digital signature generation algorithm. Examples of the digital signature generating algorithms include Rivest-Shamir-Adleman (RSA), Digital Signature Algorithm (DSA), Elliptic Curve Digital Signature Algorithm (ECDSA), and any other digital signature generating algorithms.

In some cases, as shown in FIG. 6, the signature field 610 can include a message authentication code (MAC) 612 and an s-field 614. In some cases, the MAC 612 and the s-field 614 can be formatted according to a signature protocol, e.g., the Schnorr Signature protocol. In some cases, the MAC 612 includes an output of a hash function. In some cases, the input of the hash function can include the entirety or a portion of the message to be authenticated, the private key of the electronic device, or any combinations thereof. In some cases, the length of the MAC 612 is 14 bytes. The s-field 614 includes information associated with the private key of the electronic device, e.g., the private key in binary form. In some cases, the length of the s-field is 28 bytes.

In some cases, the authentication information field 600 can include a certificate field 620. In some cases, the certificate field 620 can include a certificate associated with the private key that is used to generate the signature discussed previously. In some cases, the certificate can include an explicit certificate. An explicit certificate can include the public key, identification data of the sender, and a digital signature generated by the CA. The digital signature binds the public key to the identification data. A destination device that receives the certificate can validate the digital signature by using the public key. Alternatively the certificate can include an implicit certificate. In some cases, the public key and the identification data can be used in generate the implicit certificate. A receiver of the implicit certificate can compute the public key based on the implicit certificate and the public key of the CA.

The certificate included in the certificate field 620 can be an explicit certificate or an implicit certificate. Using an implicit certificate can reduce the size of the certificate field 620. In some cases, the length of the implicit certificate can be 40 bytes.

The timestamp field 630 include a time stamp that indicates the time the type 0 SMS message is generated or sent. In some cases, the timestamp can be formatted according to the Network Identity and Time Zone (NITZ) protocol that is specified in a 3GPP standard. In some cases, the length of the timestamp field 630 can be 5 bytes.

Returning to FIG. 3, in some cases, a destination device that receives both the message sent at 302 and the type 0 SMS message sent at 304 can use the type 0 SMS message to validate the sender of the message sent at 302. In some cases, the destination device can search all the messages received by the destination device prior to the type 0 SMS message to identify the message to be authenticated using the type 0 SMS message. Alternatively, the destination device can search a subset of prior received messages to identify the message to be authenticated. In one example, the subset of messages can include the messages that are received within a configured time period before receiving the type 0 SMS message. In another example, the subset of messages can include a configured number of messages that are received before receiving the type 0 SMS message. In some cases, the time period or the number of messages can be configured by a user, a system administrator, a manufacturer of the electronic device, or any combinations thereof.

In some cases, the destination device can identify the message to be authenticated from multiple messages by using the information included in the message information field 502 of the type 0 SMS message. For example, the destination device can generate a hash output based on each of the multiple messages, and compare the hash outputs with the hash output included in the message information field 502. If one generated hash output matches the hash output included in the message information field 502, the destination device can determine that the respective message is the message to be authenticated.

In some cases, the destination device can obtain the public key based on the certificate included in the type 0 SMS message as discussed previously. In some cases, e.g., if the type 0 SMS message does not include a certificate, the destination device can be provisioned with the public key of the electronic device prior to receiving the type 0 SMS message.

In some cases, the destination device can use the signature included in the type 0 SMS message, the public key, and the message to authenticate the message. If the authentication succeeds, then the sender of the message is validated by proof of possession of the private key associated with the public key used for authentication.

In some cases, the destination device can use the time stamp included in the type 0 SMS message to further validate the message. For example, an elapsed time can be configured. If the time duration between the time the message is received and the time indicated by the time stamp exceeds the configured elapsed time, the destination device can determine that the message may carry security risks.

In some cases, if the destination device validates the message, the destination device can output the message on the device. If the validation fails, the destination device can discard the message, output a notification on the device indicating that an invalid message is received, or a combination thereof.

Figure 4:
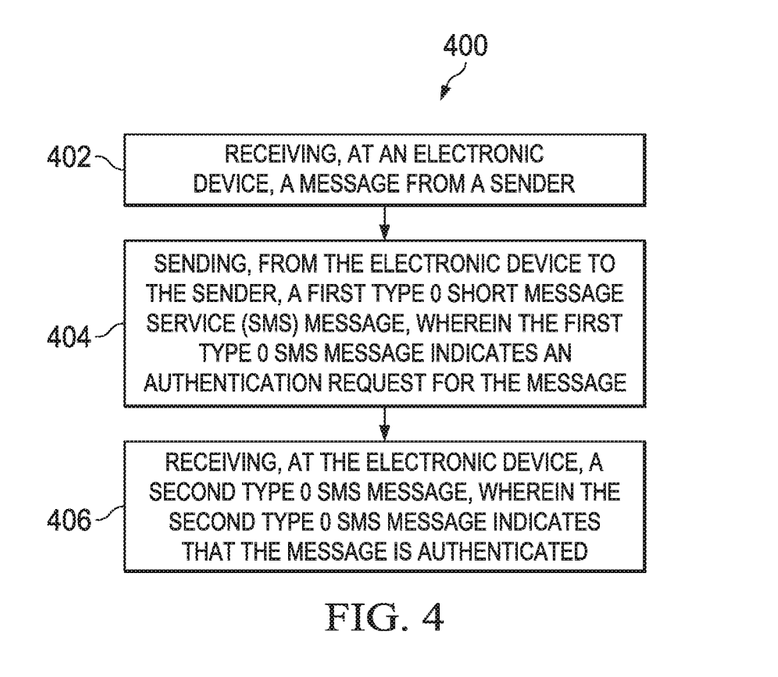
FIG. 4 is a flow diagram showing another example process for authenticating messages according to an implementation.

In some cases, an electronic device that receives a message can send a type 0 SMS message to request authentication information for the message. FIG. 4 is a flow diagram showing another example process 400 for authenticating messages according to an implementation. The process 400 can be implemented by an electronic device, e.g., the electronic device 202 shown in FIG. 2. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order.

The example process 400 begins at 402, where a message is received at an electronic device from a sender. In some cases, the sender can be a device, e.g., the sending device 102 shown in FIG. 1, that sends the message to be authenticated. In some cases, the message can be a SMS message. Alternatively, the message can be a message associated with a data application running on the electronic device.

From 402, the process 400 proceeds to 404, where the electronic device sends a first type 0 SMS message. In some cases, the first type 0 SMS message can include an authentication request for the message received at 402. The authentication request indicates that an authentication response is requested from the sender.

In some cases, the electronic device identifies the sender of the received message based on the received message. For example, the received message can include a header field that indicates the sender of the message. In some cases, the header field can indicate a name of the sender that uses the sender to send the message. In some cases, the electronic device can search the electronic device, e.g., through a contact list stored on the electronic device, to determine an address associated with the sender. The address can be a phone number that is associated with the sender. In some cases, the electronic device can send the first type 0 SMS message to the determined address. In some cases, the search can return multiple addresses, e.g., the contact list may include more than one phone numbers for the sender. In these or other cases, the electronic device can send the first type 0 SMS message to each of the multiple addresses.

In some cases, the first type 0 SMS message can be sent automatically by the electronic device without user inputs. In some cases, the first type 0 SMS message can be sent in response to a user input. For example, a user interface can be outputted on the electronic device. The user interface can indicate that a message is received and request user input on authentication. In some cases, the name of the sender, the content of received message, or a combination thereof can also be outputted on the electronic device. The user interface can enable the user to select a user action to authenticate the message. In response to a user selection to authenticate the message, the electronic device can send the first type 0 SMS message.

In some cases, a user can configure the electronic device, or a message processing application on the electronic device, or a combination thereof for message authentication settings. For example, the message processing application can be configured to operate in either an insecure mode or a secure mode. If the application operates in a secure mode, the first type 0 SMS message for authentication request can be sent without user inputs for any messages received by the application. If the application operates in an insecure mode, the electronic device can refrain from sending the first type 0 SMS message for authentication request without user input.

In some cases, the authentication request includes information that can be used to identify the message to be authenticated. For example, the authentication request can include a message index, a sequence number, information associated with the content of the message, or any combinations thereof. The information associated with the content of the message can include the entire message, the body of the message, a portion of the message, or information generated based on the message or a portion of the message, e.g., a hash output.

From 404, the process 400 proceeds to 406, where a second type 0 SMS message is received at the electronic device in response to the first type 0 SMS message. The second type 0 SMS message indicates that the message received at 402 is authenticated. In some cases, the second type 0 SMS message is generated and sent by the sender. For example, the sender can identify the message to be authenticated based on the information included in the authentication request. The sender can generate a hash output based on the message sent by the sender and compare the hash output received in the first type 0 SMS message with the generated hash output. If the generated hash output matches the received hash output, the message is authenticated and the sender can send the second type 0 SMS message indicating that the message is authenticated. In some cases, e.g., if the sender has sent multiple messages before receiving the first type 0 SMS message, the sender can compare the hash outputs generated from each of the multiple messages with the hash output included in the first type 0 SMS message. If one generated hash output matches the received hash output, the sender can authenticate the message. If none of the generated hash output matches the received hash output, the authentication fails and the sender can send the second type 0 SMS message indicating that the message is not authenticated. In some cases, the sender can attempt to authenticate all the multiple messages based on the first type 0 SMS message. Alternatively, the sender can attempt to authenticate a subset of the multiple messages. The subset can be determined based on a configured time period, a configured number of messages, or a combination thereof. The time period or the number of messages can be configured by a user, a system administrator, a manufacturer of the sender, or any combinations thereof.

In some cases, the second type 0 SMS message can also include a signature that is signed using the private key associated with the sender. In some cases, the second type 0 SMS message can also include a certificate of the sender that is associated with the private key. The electronic device can validate the second type 0 SMS message using the signature, the certificate, or a combination thereof. In some cases, the first type 0 SMS message can include an indicator that requests the signature, the certificate, or a combination thereof to be include in the second type 0 SMS message.

In some cases, an authentication status indicator can be outputted on the electronic device. The authentication status indicator can indicate whether the message received at 402 is authenticated. In some cases, the authentication status indicator can also indicate that the authentication times out, e.g., if the electronic device fails to receive the second type 0 SMS message within a configured time period. In some cases, the authentication status indicator can indicate that the authentication fails if the authentication times out.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can, optionally, include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous, and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method of authenticating a received message, comprising:
   receiving, at an electronic device, a message from a sender, wherein the message is not a type 0 short message service (SMS) message;
   in response to receiving the message:
      generating, using a hashing function, a hash output based on at least a portion of the received message; and
      sending, from the electronic device to the sender, a first type 0 short message service (SMS) message, wherein the first type 0 SMS message is a type 0 SMS message that indicates an authentication request for the message, and the first type 0 SMS message includes the hash output that is generated based on at least a portion of the received message; and
   receiving, at the electronic device, a second type 0 SMS message in response to the first type 0 SMS message, wherein the second type 0 SMS message is a type 0 SMS message indicating that the message is authenticated based on the hash output.

2. The method of claim 1, further comprising identifying the sender based on the message.

3. The method of claim 1, wherein the second type 0 SMS message includes a signature of the sender.

4. The method of claim 3, wherein the signature is generated using a private key.

5. The method of claim 1, wherein the second type 0 SMS message includes a certificate associated with the electronic device.

6. A method of authenticating a transmitted message, comprising:
   sending a message at an electronic device, wherein the message is not a type 0 short message service (SMS) message; and
   in response to sending the message, sending a type 0 short message service (SMS) message, wherein the type 0 SMS message includes authentication information for the message, and the authentication information includes a signature associated with the electronic device.

7. The method of claim 6, wherein the authentication information includes a certificate associated with the electronic device.

8. The method of claim 7, wherein the signature is generated using a private key.

9. An electronic device, comprising:
   a memory; and
   at least one hardware processor communicatively coupled with the memory and configured to:
      receive, at the electronic device, a message from a sender, wherein the message is not a type 0 short message service (SMS) message;
      in response to receiving the message:
         generate, using a hashing function, a hash output based on at least a portion of the received message; and
         send, from the electronic device to the sender, a first type 0 short message service (SMS) message, wherein the first type 0 SMS message is a type 0 SMS message that indicates an authentication request for the message, and the first type 0 SMS message includes the hash output that is generated based on at least a portion of the received message; and
      receive, at the electronic device, a second type 0 SMS message in response to the first type 0 SMS message, wherein the second type 0 SMS message is a type 0 SMS message indicating that the message is authenticated based on the hash output.

10. The electronic device of claim 9, wherein the at least one hardware processor is further configured to identify the sender based on the message.

11. The electronic device of claim 9, wherein the second type 0 SMS message includes a signature of the sender.

12. The electronic device of claim 11, wherein the signature is generated using a private key.

13. The electronic device of claim 9, wherein the second type 0 SMS message includes a certificate associated with the electronic device.

14. A non-transitory computer-readable medium containing instructions which, when executed, cause a computing device to perform operations for authenticating a received message, the operations comprising:
   receiving, at an electronic device, a message from a sender, wherein the message is not a type 0 short message service (SMS) message;
   in response to receiving the message:
      generating, using a hashing function, a hash output based on at least a portion of the received message; and sending, from the electronic device to the sender, a first type 0 short message service (SMS) message, wherein the first type 0 SMS message is a type 0 SMS message that indicates an authentication request for the message, and the first type 0 SMS message includes the hash output that is generated based on at least a portion of the received message; and receiving, at the electronic device, a second type 0 SMS message in response to the first type 0 SMS message, wherein the second type 0 SMS message is a type 0 SMS message indicating that the message is authenticated based on the hash output.

15. The computer-readable medium of claim 14, the operations further comprising identifying the sender based on the message.

16. The computer-readable medium of claim 14, wherein the second type 0 SMS message includes a signature of the sender.

17. The computer-readable medium of claim 16, wherein the signature is generated using a private key.

\* \* \* \* \*